(12) United States Patent
Chengalvarayan et al.

(10) Patent No.: US 7,676,363 B2
(45) Date of Patent: Mar. 9, 2010

(54) AUTOMATED SPEECH RECOGNITION USING NORMALIZED IN-VEHICLE SPEECH

(75) Inventors: Rathinavelu Chengalvarayan, Naperville, IL (US); Scott M Pennock, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 850 days.

(21) Appl. No.: 11/427,590

(22) Filed: Jun. 29, 2006

(65) Prior Publication Data

US 2008/0004875 A1 Jan. 3, 2008

(51) Int. Cl.
G10L 15/20 (2006.01)
G10L 19/14 (2006.01)
G10L 21/00 (2006.01)

(52) U.S. Cl. .................. 704/233; 704/226; 704/234; 704/270

(58) Field of Classification Search .................. None
See application file for complete search history.

(56) References Cited

U.S. PATENT DOCUMENTS

| | | | | |
|---|---|---|---|---|
| 5,712,956 | A * | 1/1998 | Yamada et al. | 704/234 |
| 5,864,809 | A * | 1/1999 | Suzuki | 704/254 |
| 7,136,494 | B2 * | 11/2006 | Watson et al. | 381/86 |
| 7,451,082 | B2 * | 11/2008 | Gong et al. | 704/233 |
| 2003/0115054 | A1 * | 6/2003 | Iso-Sipila | 704/233 |
| 2005/0226431 | A1 * | 10/2005 | Mao | 381/61 |
| 2007/0073539 | A1 * | 3/2007 | Chengalvarayan et al. | 704/245 |

FOREIGN PATENT DOCUMENTS

DE 10311587 A1 * 9/2004

OTHER PUBLICATIONS

Schopp, H. et al. "New methods of adaptive sound reinforcement in car enviornment" AES 92nd Convention, Mar. 24-27, 1992.*
Chi, S. et al. "Lombard effect compensation and noise suppression for Lombard speech recognition" Spoken Language, ICSLP 96, Proceedings vol. 4, pp. 2013-2016, 1996.*
Miyoshi, et al. "Inverse filtering of room acoustics" IEEE Transactions on Acoustics, Speech and Signal Processing, vol. 36, No. 2, Feb. 1988.*
Diaz-de-Maria, et al. "Linear Equalization of the Modulation Spectra: A novel approach for noise speech recognition" Int'l Conference on Acoustics, Speech and Signal Processing, 2003.*

* cited by examiner

*Primary Examiner*—Matthew J Sked
(74) *Attorney, Agent, or Firm*—Anthony L. Simon; Reising Ethington P.C.

(57) ABSTRACT

A speech recognition method includes the steps of receiving speech in a vehicle, extracting acoustic data from the received speech, and applying a vehicle-specific inverse impulse response function to the extracted acoustic data to produce normalized acoustic data. The speech recognition method may also include one or more of the following steps: pre-processing the normalized acoustic data to extract acoustic feature vectors; decoding the normalized acoustic feature vectors using as input at least one of a plurality of global acoustic models built according to a plurality of Lombard levels of a Lombard speech corpus covering a plurality of vehicles; calculating the Lombard level of vehicle noise; and/or selecting the at least one of the plurality of global acoustic models that corresponds to the calculated Lombard level for application during the decoding step.

20 Claims, 6 Drawing Sheets

AUTOMATED SPEECH RECOGNITION USING NORMALIZED IN-VEHICLE SPEECH

TECHNICAL FIELD

This invention relates to speech signal processing and, more particularly, to automated speech recognition (ASR).

BACKGROUND OF THE INVENTION

ASR technology enables microphone-equipped computing devices to interpret speech and thereby provide an alternative to conventional human-to-computer input devices such as keyboards or keypads. For example, vehicle telecommunications devices are equipped with voice dialing features enabled by an ASR system. Typically, ASR users significantly vary the way they articulate their speech in response to changes in background noise of a vehicle. Vehicle background noise is influenced by several external and internal noises, such as the type of road the vehicle is traversing, the speed the vehicle travels, wind noise, noise external to the vehicle, air conditioning settings, and other factors. As vehicle background noise varies in intensity, ASR users tend to vary the volume and the pitch of their utterances. Such variation in user articulation in response to environmental influences is known as the Lombard effect and tends to impede an ASR system from quickly and accurately recognizing speech utterances.

Therefore, according to current ASR implementations, different acoustic models are empirically developed for different types of vehicle cabin environments, in an attempt to match actual conditions of in-vehicle speech recognition. But this approach can involve multitudes of different and unnecessarily complex acoustic models, thereby possibly delaying model development, increasing computing memory and power requirements, and yielding an unacceptable level of latency in speech recognition.

SUMMARY OF THE INVENTION

According to one aspect of the present invention, there is provided a speech recognition method, comprising the steps of:
(a) receiving speech in a vehicle;
(b) extracting acoustic data from the received speech; and
(c) applying a vehicle-specific inverse impulse response function to the extracted acoustic data to produce normalized acoustic data.

The speech recognition method may also include one or more of the following additional steps:
(d) pre-processing the normalized acoustic data to extract normalized acoustic feature vectors;
(e) decoding the normalized acoustic feature vectors using as input at least one of a plurality of global acoustic models, wherein each model is distinguished from the other models based on a Lombard level;
(f) calculating a Lombard level of vehicle noise; or
(g) selecting the at least one of the plurality of global acoustic models that corresponds to the calculated Lombard level for application during the decoding step.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
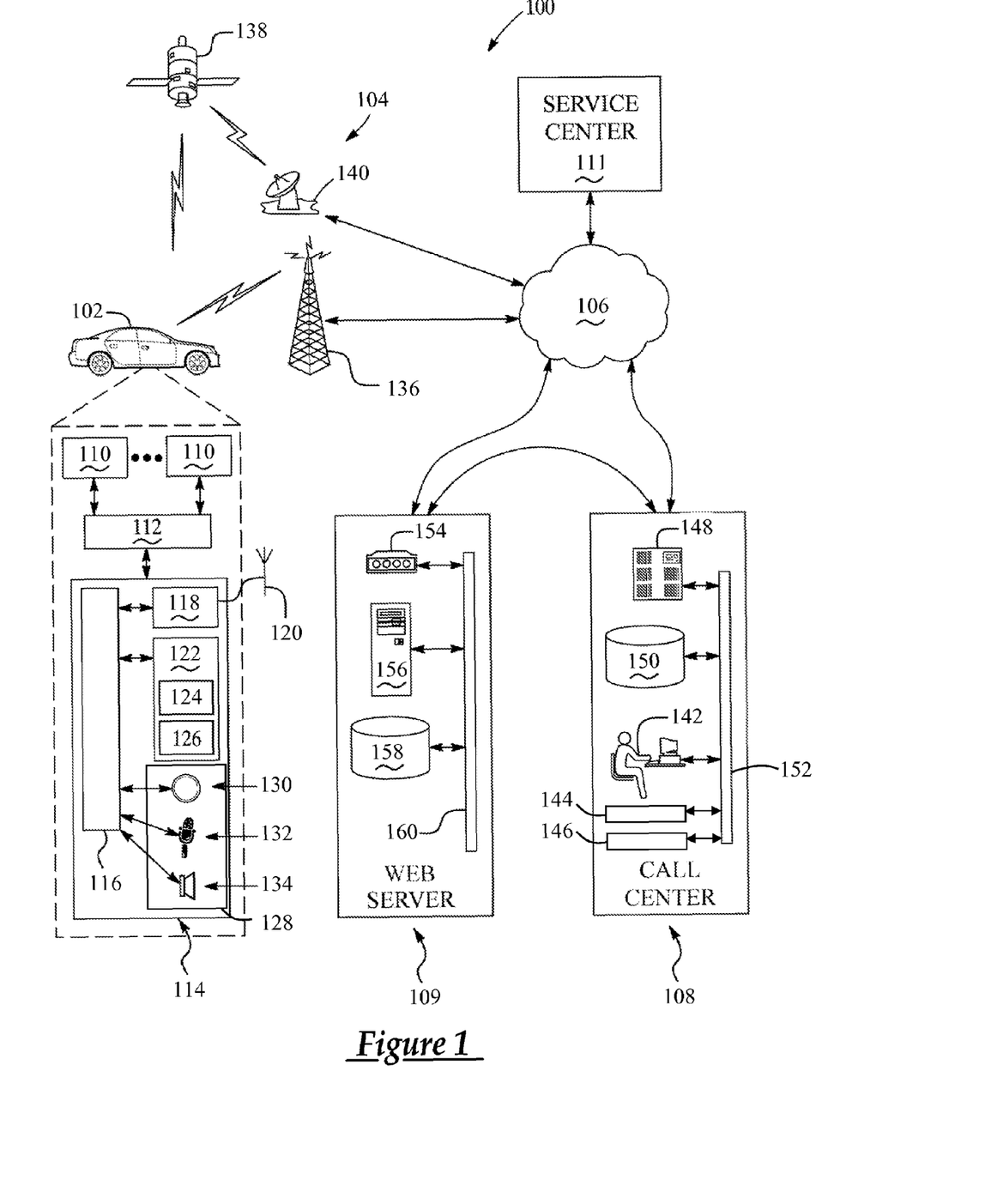
FIG. 1 is a block diagram depicting an example of a telematics system that can be used to implement exemplary methods of speech recognition.
Figure 2:
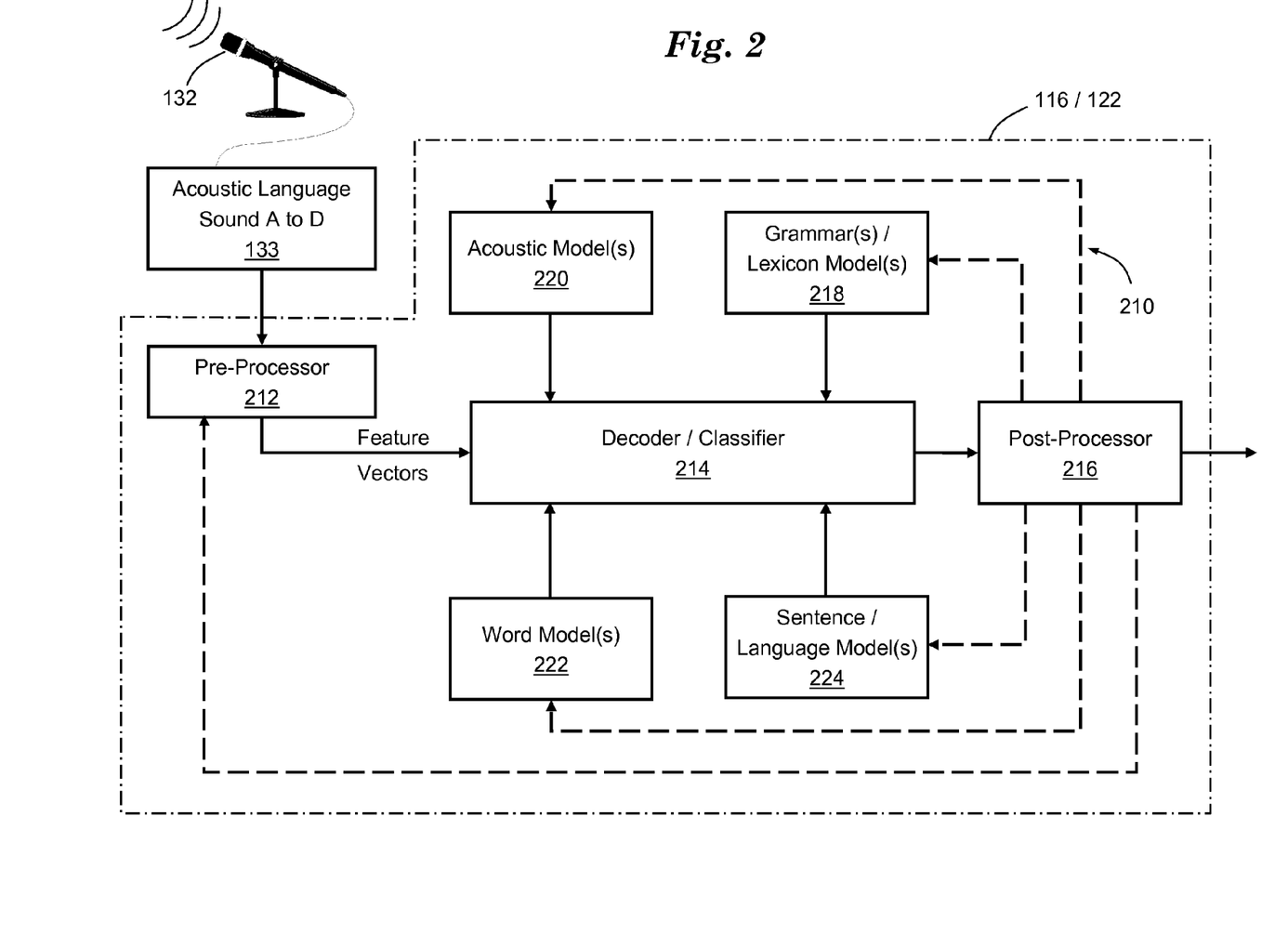
FIG. 2 is a block diagram illustrating an example ASR architecture that can be embedded within the telematics system of FIG. 1 and used to implement exemplary methods of speech recognition.

An exemplary operating environment enabled with automated speech recognition (ASR) is illustrated in FIGS. 1 and 2, and can be used to implement the illustrated embodiments speech recognition methods. These methods can be particularly useful for voice dialing applications, voice activated web browsing applications, or the like. The methods can include speech recognition generally and improved applications of speech recognition, and are discussed in detail further below in conjunction with FIGS. 3 through 7.

The methods can be carried out using any suitable ASR-enabled system. Preferably, however, the methods are carried out in conjunction with an ASR-enabled telematics system such as the illustrated system 100, which can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with the aforementioned elements to provide services to the vehicle 102.

The exemplary telematics system 100 generally facilitates numerous services to the occupant(s) of the vehicle 102, including vehicle navigation, turn-by-turn driving directions, telephony including automated audio interaction with the occupant, emergency services, vehicle diagnostics, vehicle system updates, and ASR. For this purpose the telematics system 100 processes data and instructions as well as facilitates wireless voice and data transfer between hardware located on the vehicle 102 and hardware in the remote call center 108. For example, the telematics system 100 enables the vehicle occupant to initiate voice communication, for example, with the call center 108 or the service center 111. Also, the telematics system 100 enables electronic communication between the vehicle 102 and the web server 109 for various purposes such as transmitting and/or receiving information such as updated voice messages, email, news, or the like.

Motor Vehicle

The motor vehicle 102 is depicted in the illustrated embodiment as a passenger vehicle, and it will be appreciated that any other mobile vehicles including marine vehicles, aircraft, and other automobiles such as vans, trucks, etc., can be used without departing from the scope of the invention. Various electronic modules can be located on the vehicle 102 and include one or more vehicle sub-systems or vehicle system modules (VSMs) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent all of the subsystems throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration, such as a Controller Area Network (CAN), Media Oriented System Transport (MOST), Local Interconnect Network (LIN), Ethernet (10baseT, 100baseT), Local Area Network (LAN), ISO Standard 9141, ISO Standard 11898 for high-speed applications, ISO Standard 11519 for lower speed applications, SAE Standard J1850 for high-speed and lower speed applications, and/or the like.

Vehicle Telematics Unit

The vehicle telematics unit 114 facilitates communication and interactivity between the vehicle 102 or occupant thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 executes one or more speech recognition programs and process speech recognition data to carry out ASR. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 are used for monitoring, recognizing, and/or recording utterances or speech from a vehicle occupant via the user interface 128. The database 126 is used to store voice message data, diagnostic trouble code data, or other diagnostic data. For example, the database 126 includes speech recognition databases such as acoustic models, vocabularies, grammars, and the like. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular satellite, or other wireless path, and facilitates both voice and data communications. For example, the wireless communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as CDMA or GSM, but could also utilize proprietary or other wireless technologies to communicate with the wireless communication system 104. The wireless communications device 118 can include additional or integrated functionality such as satellite communications software and hardware including a global positioning system (GPS) receiver. Such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows a vehicle occupant to provide voice commands or other verbal input into the telematics unit 114, as well as voice communication with various remote locations via the communications device 122. Voice commands from the vehicle occupant can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupant through audible speech, signals, or audio files, and can be stand-alone speakers specifically dedicated for use with the telematics unit 114, or they can be part of the vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), or any other suitable wireless network used to transmit voice and data signals between the vehicle 102 and various remote locations such as the call center 108 and/or service center 111. In one embodiment, the cellular network 136 is implemented as a CDMA, GSM, or other cellular communication network that exchanges voice and data between the vehicle 102 and the second communication system 106. Additionally or alternatively, wireless communication can be carried out by satellite transmission using one or more satellites 138 to connect the vehicle 102 to the second communication system 106 via a central, ground-based satellite transceiver 140.

The second communication system 106 can be another wireless communication system or can be a land-based wired system such as a public switched telephone network (PSTN), an Internet Protocol (IP) network, an optical network, fiber network, or other cable network, and/or any combination of the aforementioned examples, any of which can be used for voice and/or data communication. Those skilled in the art will recognize that the communication systems 104, 106 can be implemented separately or can be combined as an integral system.

Call Center

The call center 108 includes one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer (s) used by the one or more advisors 142. For example, the servers 148 and databases 150 execute and store one or more speech recognition programs and speech recognition data to carry out ASR, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables a vehicle occupant to access websites and other content over the Internet, all from the vehicle using automated speech recognition technology and text-to-voice technology such as VoiceXML, or the like. For example, a vehicle occupant can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupant via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that a vehicle occupant can initiate a telephone call with a technician or service scheduler at the service center 111.

Exemplary ASR System

In general, a human user vocally interacts with an automatic speech recognition system for one or more fundamental purposes: to train the system to understand the user's voice; to store discrete speech such as a spoken nametag or a spoken control word like a numeral or keyword; or to use the recognition system to have the user's speech recognized and used for some useful end purpose such as voice dialing, menu navigation, transcription, or the like. In general, ASR extracts acoustic data from human speech, compares/contrasts the acoustic data to stored subword data, selects an appropriate subword which can be concatenated with other selected subwords, and outputs the corresponding subwords or words for post-processing such as dictation or transcription, address book dialing, storing to memory, training ASR models or adaptation parameters, or the like.

ASR systems are generally known to those skilled in the art, and FIG. 2 illustrates an exemplary specific architecture for an ASR system 210 that can be used to implement the method described below. The system 210 includes a device to receive speech such as the telematics microphone 132 and an acoustic interface 133 such as the telematics soundcard to digitize the speech into acoustic data. The architecture 210 also includes a memory such as the telematics memory 122 for storing the acoustic data and storing speech recognition software and databases, and a processor such as the telematics processor 116 to process the acoustic data. The processor 116 uses the speech recognition databases, a front-end processor or pre-processor software module 212 for parsing streams of the acoustic data of the speech into parametric representations such as acoustic features, a decoder software module 214 for decoding the acoustic features to yield digital subword or word output data corresponding to the input speech utterances, and a post-processor software module 216 for using the output data from the decoder module 214 for any suitable purpose.

One or more modules or models are used as input to the decoder module 214. First, grammar or lexicon model(s) 218 provide rules governing which words can logically follow other words to form valid sentences. In a broad sense, a grammar also defines a universe of vocabulary the system expects at any given time in any given ASR mode. For example, if the system 210 is in a training mode for training commands, then the grammar model(s) 218 can include all commands known to and used by the system 210. Second, acoustic model(s) 220 assist with selection of most likely subwords or words corresponding to input from the pre-processor module 212. Third, word model(s) 222 and sentence/language model(s) 224 provide syntax and/or semantics in placing the selected subwords or words into word or sentence context. Also, the sentence/language model(s) can define a universe of sentences the system expects at any given time in any given ASR mode and/or can provide rules governing which sentences can logically follow other sentences to form valid extended speech.

According to an alternative exemplary embodiment, some or all of the ASR system 210 can be resident on, and processed using, computing equipment in a location remote from the vehicle 102, such as the call center 108, web server 109, or the like. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software such as HMM decoders can be processed using processors of one of the servers 148 in the call center 108. In other words, the ASR system 210 can be distributed across the call center 108 and the vehicle 102 in any desired manner. Likewise, the methods described herein can be carried out entirely by the telematics unit 114 of the vehicle 102, by the computing equipment in the call center 108, or by any combination thereof.

Extracting Acoustic Data

First, acoustic data is extracted from human speech wherein a user speaks into the microphone 132, which converts the utterances into electrical signals and communicates such signals to the acoustic interface 133. A sound-responsive element in the microphone 132 captures the user's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into streams of digital data. In other words, the acoustic interface 133 converts the analog signals into digital electronic signals. The digital data are binary bits which are buffered in the telematics memory 122 and then processed by the telematics processor 116 or can be processed as they are initially received by the processor 116 in real-time.

Pre-Processing

Second, the pre-processor module 212 transforms the continuous stream of digitized speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the user's speech, such as time-varying feature vectors, from within each frame. Utterances within the user's speech can be represented as sequences of these feature vectors. For example, and as known to those skilled in the art, feature vectors can be extracted and can include, for example, vocal pitch, energy profiles, and/or spectral attributes, or cepstral coefficients that are obtained by performing Fourier transforms of the frames and decorrelating acoustic spectra using cosine transforms. Thus, an unknown test pattern of speech is a concatenation of related acoustic frames and corresponding parameters covering a particular duration of speech.

Decoding

Third, the processor executes the decoder module 214 to process the incoming feature vectors of each test pattern. The decoder module 214 is also known as a recognition engine or classifier and uses stored known reference patterns of speech. Like the test patterns, the reference patterns are defined as a concatenation of related acoustic frames and corresponding parameters. The decoder module 214 compares and contrasts the acoustic feature vectors of a subword to be recognized with stored subword models or patterns, assesses the magnitude of the differences or similarities therebetween, and ultimately uses decision logic to choose a best matching subword from the models as the recognized subword. The best matching subword is typically that which corresponds to the stored known reference pattern that has the minimum dissimilarity to, or highest probability of being, the test pattern.

Recognized subwords can be used to construct words with help from the word models 222 and to construct sentences with the help from the language models 224. The decoder module 214 can use various techniques known to those skilled in the art to analyze and recognize subwords, including but not limited to dynamic time-warping classifiers, artificial intelligence techniques, neural networks, free phoneme recognizers, and probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword, such as by the application of Bayes' Theorem. A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMM's for a sequence of subwords can be concatenated to establish word HMM's.

The speech recognition decoder 214 processes the feature vectors using the appropriate acoustic models, grammars, and algorithms to generate an N-best list of nametag templates. As used herein, the term templates is interchangeable with models, waveforms, reference patterns, rich signal models, exemplars, hypotheses, or other types of references. A template can include a series of feature vectors representative of a word or subword and can be based on particular speakers, speaking styles, and audible environmental conditions. Those skilled in the art will recognize that templates can be generated by suitable template training of the ASR system and stored in memory. Those skilled in the art will also recognize that stored templates can be manipulated, wherein parameter values of the templates are adapted based on differences in speech input signals between template training and actual use of the ASR system. For example, a set of templates trained for one ASR user or certain acoustic conditions can be adapted and saved as another set of templates for a new ASR user or new acoustic conditions, based on a limited amount of training data from the new user or the new acoustic conditions. In other words, the templates are not necessarily fixed and can be processed during speech recognition.

Using the in-vocabulary grammar and any suitable decoder algorithm(s) and acoustic model(s), the processor accesses from memory several templates interpretive of the spoken command. For example, the processor can generate, and store to memory, a list of N-best vocabulary results or templates, along with corresponding parameter values. Exemplary parameter values can include confidence scores of each template in the N-best list of vocabulary and associated segment durations, likelihood scores, signal-to-noise (SNR) values, and/or the like. The N-best list of vocabulary can be ordered by descending magnitude of the parameter value(s). For example, the vocabulary template with the highest confidence score is the first best template, and so on.

Post-Processing

The post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212, or the like.

Method of Recognizing Normalized In-Vehicle Speech

A method of recognizing normalized in-vehicle speech is provided herein and can be carried out as one or more computer programs using the architecture of the ASR system 210 within the operating environment of the telematics system 100 described above. Those skilled in the art will also recognize that the method can be carried out using other ASR systems within other operating environments.

In general, the method is provided to improve speech recognition performance by reducing variability of speech and noise signals by accurately removing vehicle-specific information from in-vehicle utterances. In other words, particular acoustic characteristics of a vehicle are factored out of speech utterances just prior to speech decoding, so that relatively simple, non-vehicle-specific acoustic models can be used to decode the utterances. Thus, the method can be used to reduce the complexity of acoustic models and to generate a single set of acoustic models that can be applied to speech decoding across a plurality of different vehicles or vehicle types. Because the complexity of the set of acoustic models is reduced, those skilled in the art will recognize that less memory, computing power, and time can be used to apply the acoustic models during decoding. In turn, latency of the speech recognition can also be reduced. Ultimately, applying normalization techniques according to the present methods improves speech recognition accuracy and speed.

Figure 3:
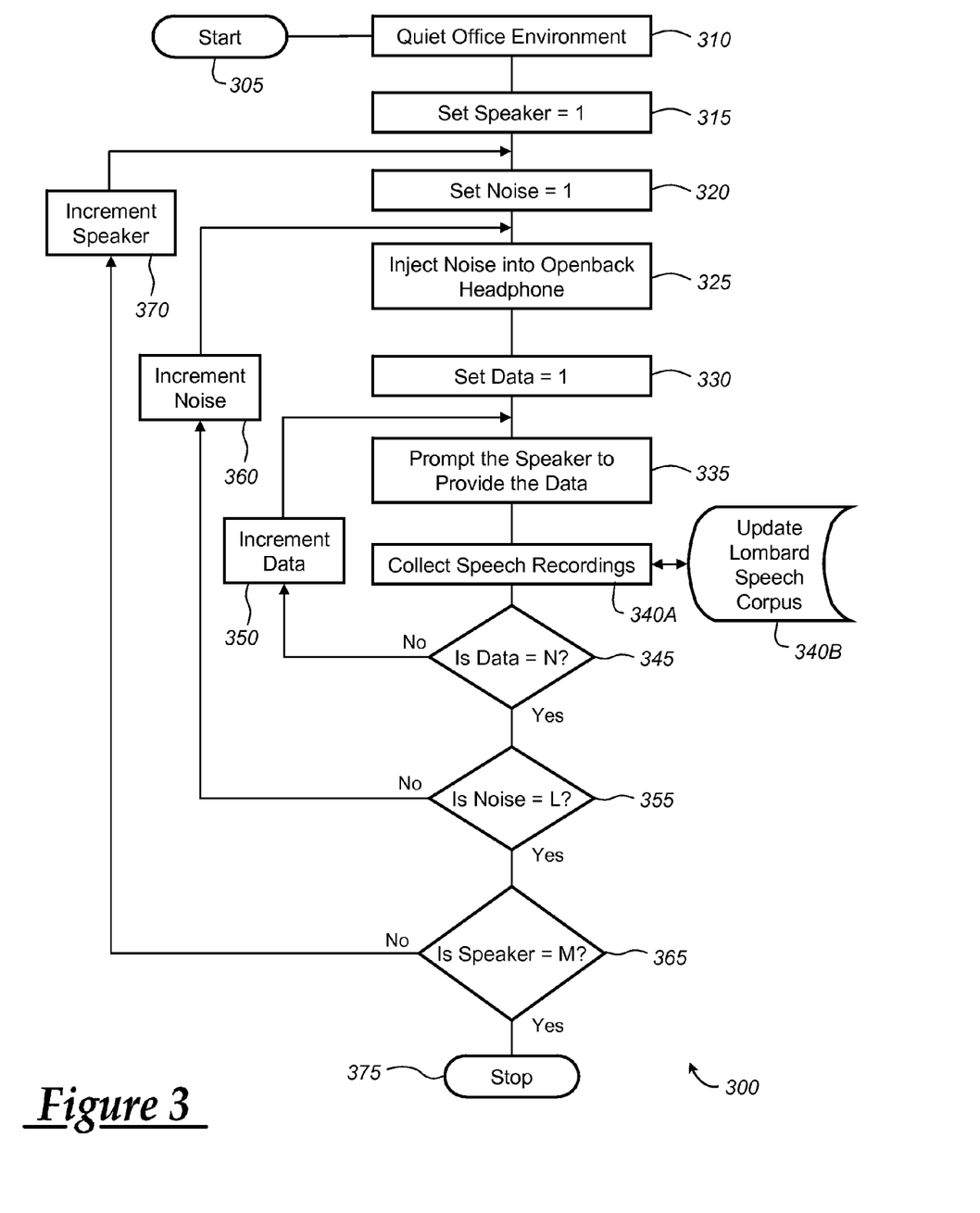
FIG. 3 is a flow chart of an embodiment of an exemplary method of developing a corpus of Lombard speech data that can be performed using the telematics system and ASR architecture of FIGS. 1 and 2.

FIG. 3 illustrates an exemplary method of developing a corpus of Lombard speech data 300 for a plurality of vehicles. The method is initialized at step 305 and is preferably carried out in a quiet, sound-controlled environment such as an office environment, as shown at step 310. The Lombard speech data is developed using a plurality of speakers, a plurality of different levels of noises, and a plurality of different utterances, all of which are tracked.

In one exemplary implementation, a person or speaker wears open-back headphones with a boom microphone and sits in front of a display of a computer. The user responds to a set of guided utterances visually prompted as text by the display under computer program control. A guided utterance is a request to the speaker to utter words or phrases known to a speech recognition acoustic model, such as the utterance of the number "two" or the phrase "place a call" or the like. The computer may include any suitable processor and memory for storing, recalling, and processing any data, and any software programs including algorithms according to the method 300 or any portion thereof.

At step 315, a speaker flag is set to 1 to track the number of different speakers used in developing the Lombard speech corpus.

At step 320, a noise flag is set to 1 to track the number of different noise levels used for each particular speaker in developing the Lombard speech corpus.

At step 325, a level of a plurality of different levels of any suitable types of noise is introduced through the speaker's open-back headphones. The different levels of noise can simulate different types of in-cabin noise that a vehicle experiences when on the road. Exemplary types of noise include cabin HVAC blower, road noise at different vehicle speeds and on different types of roads, wind noise such as occurs when a vehicle window is open during driving and other noises that may occur in a vehicle cabin.

The number of different Lombard levels of noise can be set at discrete intervals in any suitable quantity, and the Lombard level of each utterance in the corpus can be associated with a closest or nearest discrete set level. For example, the levels may be set as low, medium, and high relative to the expected Lombard noise ranges for a particular motor vehicle. More than three levels may be set if desired, and the Lombard level unit of loudness may be in any suitable unit of measure, such as sones. Each playback of noise has associated data identifying the level of the noise introduced into the speaker's headphones and the loudness of the introduced noise is the Lombard level for each utterance.

At step 330, a data flag is set to 1 to track the number of different utterances used for each particular noise level in developing the Lombard speech corpus.

At step 335, the speaker is prompted via visual text to speak all of the Lombard vocabulary being trained with the different levels of noise. In other words, the speaker is prompted to repeat a word or phrase in the vocabulary for each noise level introduced in the speaker's headphones. For example, the speaker can be prompted to say "Call" or the like.

At step 340A and 340B, the speaker utterances are collected via the boom microphone and recorded in a database in computer memory for later use. At step 106, the corpus, or set of utterances, with Lombard information is updated. For example, a Lombard speech corpus may be comprised of a set of 48 kHz 16 bit signals recorded by many different people and, for some applications, 500 speakers may make a suitable corpus.

At step 345, the current utterance is compared to a predetermined number of utterances to determine whether all utterances in an utterance data set have been recorded for the current noise level. If not, then the method proceeds to step 350, wherein an utterance data counter is incremented and, thereafter, the method loops back through steps 335 to 345. If so, however, then the method proceeds to step 355.

At step 355, the current noise level is compared to a predetermined number of noise levels to determine whether all noise levels in a noise level data set have been recorded for the current speaker. If not, then the method proceeds to step 360, wherein a noise level data counter is incremented and, thereafter, the method loops back through steps 325 to 355. If so, however, then the method proceeds to step 365.

At step 365, the current speaker is compared to a predetermined number of speakers to determine whether all speakers in a speaker data set have been recorded for the Lombard speech corpus. If not, then the method proceeds to step 370, wherein a speaker data counter is incremented and, thereafter, the method loops back through steps 320 to 365. If so, however, then the method ends at step 375.

Figure 4:
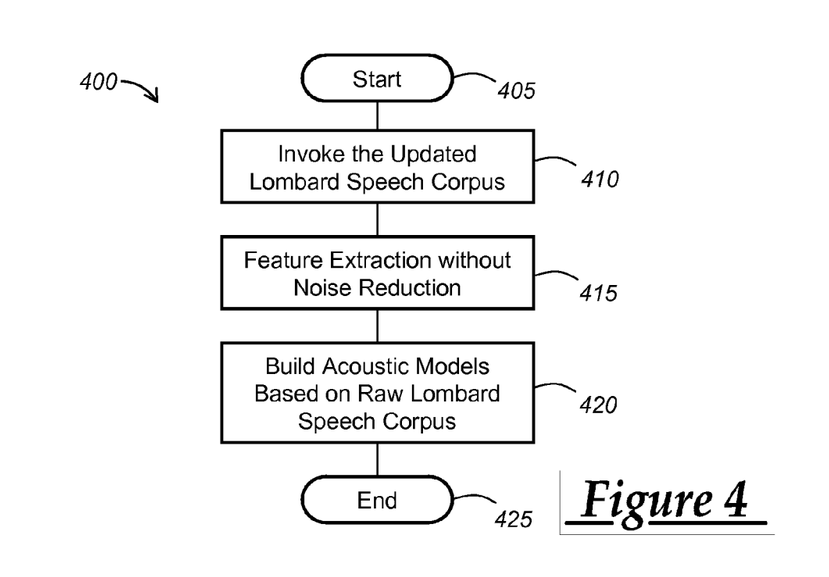
FIG. 4 is a flow chart of an embodiment of an exemplary method of building a plurality of global acoustic models without noise reduction that can be performed in conjunction with the method of FIG. 3 and using the telematics system and ASR architecture of FIGS. 1 and 2.

FIG. 4 illustrates an exemplary method 400 of building a plurality of acoustic models without noise reduction. The method is initialized at step 405.

At step 410, the Lombard speech corpus from step 340B of the method 300 above is invoked.

At step 415, acoustic features are extracted from the Lombard speech corpus. The feature acquisition is carried out without any noise reduction techniques because the Lombard data has little to no noise because of the controlled environmental conditions in which the corpus was created. Any suitable acoustic features may be extracted including, for example, Mel-frequency cepstral coefficients, or the like. Acoustic feature acquisition has been discussed previously herein, and generally is known to those skilled in the art.

At step 420, acoustic models are built or trained using the speech features extracted from the Lombard speech corpus, which covers a plurality of vehicles. The acoustic models may be trained according to Lombard levels, such that each model of a plurality of acoustic models is distinguished from the other models based on a Lombard level. For example, a set of low Lombard level data from the Lombard speech corpus can be invoked, speech features extracted therefrom, and a low Lombard level global acoustic model built. The acoustic models built using this method are considered global in the sense that one acoustic model or set of models can be used in conjunction with a plurality of different vehicle types. Thereafter, the method ends at step 425.

Figure 5:
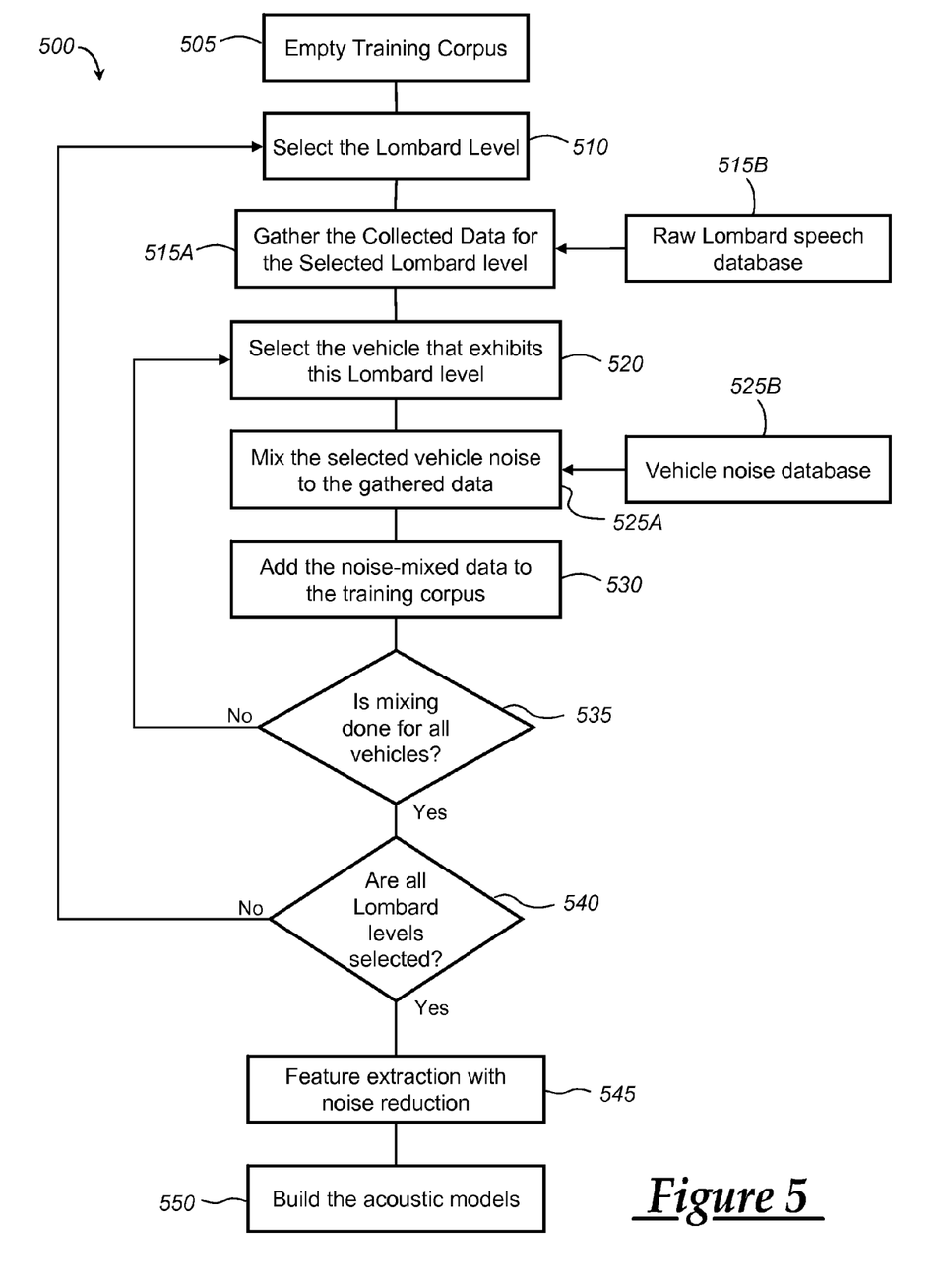
FIG. 5 is a flow chart of an embodiment of an exemplary method of building a plurality of global acoustic models with noise reduction that can be performed in conjunction with the method of FIG. 3 and using the telematics system and ASR architecture of FIGS. 1 and 2.

FIG. 5 illustrates an exemplary method 500 of building a plurality of acoustic models with noise reduction.

At step 505, a training corpus is emptied. The training corpus can be a subset of the Lombard level corpus discussed previously.

At step 510, a Lombard level of a plurality of Lombard levels is selected. For example, during a first pass a low Lombard level can be selected, during a second pass a medium Lombard level can be selected, and during a third pass a high Lombard level can be selected.

At steps 515A and 515B, the raw Lombard data corresponding to the Lombard level selected in step 510 is gathered from the Lombard speech corpus developed in steps 340A and 340B in the previously discussed method 300.

At step 520, vehicles are selected that exhibit the selected level of the plurality of Lombard levels.

At steps 525A and 525B, a vehicle noise database is invoked and noise at appropriate levels from the selected vehicle is mixed with the data gathered in step 515A. The data are mixed to simulate vehicle operating conditions. The vehicle specific noise can be comprised of ambient noise recordings within the vehicle at different speeds, along with varied interior and exterior ambient noise combinations. Example conditions for recording vehicle noise can include the vehicle traveling at forty-five miles per hour over a segmented concrete road with the air conditioning system set at level three, the vehicle traveling at sixty miles per hour on a blacktop surfaced road with the driver and passenger's windows lowered, or the like. Those skilled in the art are familiar with methods to mix acoustic data, and a system designer can readily set a variety of conditions to create vehicle noise sets for use in this process. An acoustic model trained according to Lombard level data mixed with internal and external noise perceptible within the vehicle cabin, wherein noise reduction is applied to feature extraction, may better match the test condition scenarios, minimize degradation of recognition due to severe mismatches, and boost recognition performance.

At step 530, the noise-mixed data from step 525A is added to the acoustic model training corpus.

At step 535, it is determined whether noise mixing has been carried out for all relevant vehicles. If not, then the method loops back to steps 520 through 535, until mixing has been carried out for all vehicles. If so, then the method proceeds to step 540.

At step 540, it is determined whether data mixing has been carried out across all Lombard levels. If not, then the method loops back to steps 510 through 540, until data mixing has been carried out for all Lombard levels. If so, then the method proceeds to step 545.

At step 545, acoustic features are extracted from the training corpus. The extraction is carried out with any suitable noise reduction techniques. Any suitable acoustic features may be extracted including, for example, Mel-frequency cepstral coefficients, or the like. Acoustic feature extraction has been discussed previously herein, and generally is known to those skilled in the art. Likewise noise reduction techniques are also generally known to those skilled in the art.

At step 550, acoustic models are built or trained using the speech features extracted from the Lombard speech corpus, which covers a plurality of vehicles. The acoustic models may be trained according to Lombard levels, such that each model of a plurality of acoustic models is distinguished from the other models based on a Lombard level. For example, a set of low Lombard level data from the Lombard speech corpus can be invoked and mixed with vehicle noise, speech features extracted therefrom with noise reduction, and a low Lombard level global acoustic model built. The acoustic models built using this method are considered global in the sense that one acoustic model or set of models can be used in conjunction with a plurality of different vehicle types.

Figure 6:
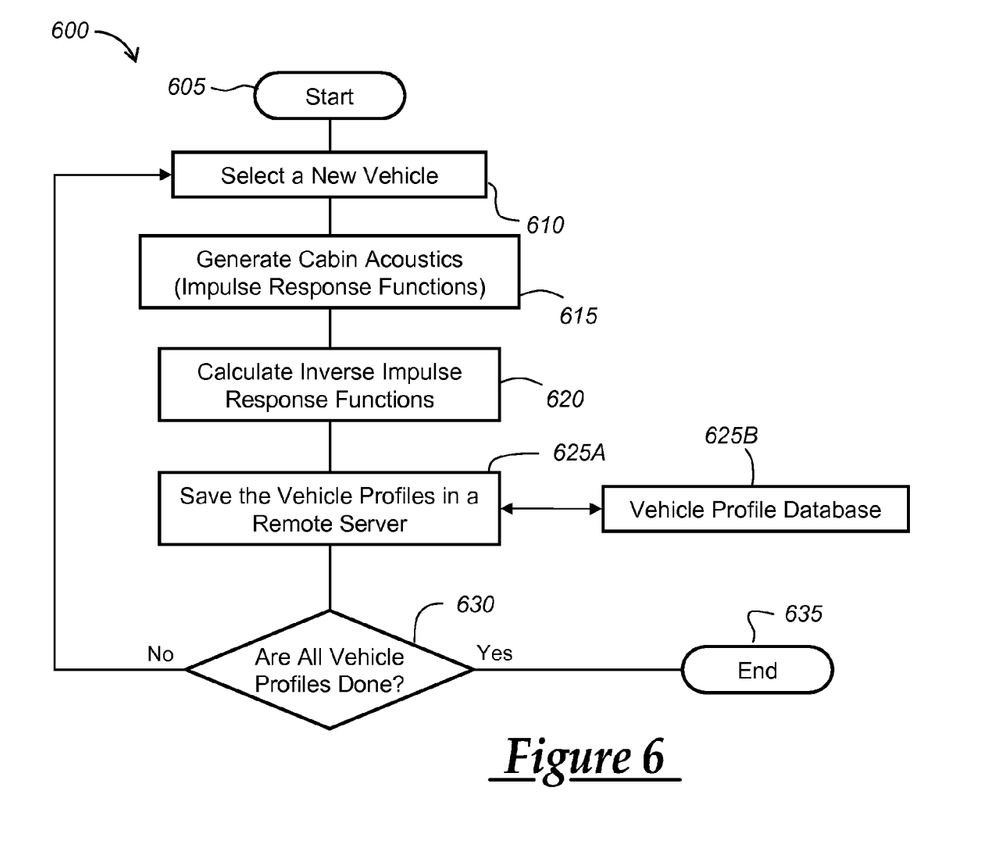
FIG. 6 is a flow chart of an embodiment of an exemplary method of generating vehicle-specific inverse impulse response functions that can be performed using the telematics system and ASR architecture of FIGS. 1 and 2.

FIG. 6 illustrates a method 600 of generating vehicle-specific inverse impulse response functions, which can be used to normalize in-vehicle speech as will be discussed in detail with regard to FIG. 7. The method 600 is initialized at step 605.

At step 610, a new vehicle is selected. The vehicle may be an individual vehicle or a cluster of a related vehicle type such as bus, truck, sedan, coupe, or the like.

At step 615, cabin acoustics are generated for the vehicle as a function of impulse response. An impulse response is a measurement of sound pressure versus time. Further, an impulse response is the manner in which a device, in this example a vehicle cabin and a microphone or microphone array, behaves after acoustic energy input has ceased. The energy in an impulse is spread evenly over a wide frequency band, making it convenient for use as a test signal to measure the characteristics of an audio system or apparatus. The vehicle cabin impulse response can be vehicle-specific, such as for a particular vehicle design, or for a particular cluster, class, or line of vehicles, such as, for example, a mid-size truck line with similarly designed interiors and can be measured for each vehicle or vehicle type in a manner known to those skilled in the art.

Vehicle impulse response may be determined with any suitable equipment. For example, a head and torso simulator (HATS) can be placed in a vehicle cabin. Attached to the HATS is a speaker in a position that simulates the location of a human mouth. A white noise generator can be used to play white noise through the speaker.

A mouth reference position (MRP) microphone is placed at a suitable acoustic point with respect to the HATS speaker. In one example, an acoustic point for recording a user utterance is fifty millimeters from the lip plane of the user. The MRP microphone can be connected to a sound card to transmit the audio signal generated by the HATS speaker to a first channel of the sound card for processing.

An integrated vehicle microphone (IVM) is a built-in microphone connected to a telematics unit and is used during normal vehicle operation as well as during impulse response calculations. The output of the IVM is connected to a high impedance tap that transmits the audio signal generated by the HATS speaker to a second channel of the sound card for processing. The distance between the MRP and the IVM is known as the speech path.

The sound card is connected to a personal computer (PC). The PC uses the incoming audio data on the channels of the sound card to determine the correlation and/or covariance between the audio signal received at the first channel and the audio signal received at the second channel, thus yielding the impulse response of the vehicle cabin and microphone. In other words, for purposes of calculating the impulse response along the speech path, the MRP is treated as an input signal and the IVM is treated as an output signal.

At step 620, inverse impulse response functions are determined for every vehicle or vehicle type. For example, if the inverse of the impulse response used in creating a vehicle cabin recording is already known, then an original signal corresponding to the MRP can be mathematically calculated as shown by Equations 1 and 2 below:

$$U\_filtered(t) = f(U(t)), \text{ wherein} \qquad \text{Eq. 1}$$

U(t)=clean speech at MRP
$f$=impulse response function
$f(U(t))$=vehicle speech at IVM $$U(t) = f^{-1}(f(U(t))) \qquad \text{Eq. 2}$$

In another example, the inverse impulse response function can be determined by swapping the first and second channels, such as by designating the IVM as an input and the MRP microphone as the output. In other words, the PC uses the incoming audio data on the swapped channels of the sound card to determine the correlation and/or covariance between the audio signal received from the IVM at the first channel and the audio signal received from the MRP at the second channel, thus yielding the inverse impulse response of the vehicle cabin and microphone.

At step 625, the inverse impulse response function is then stored, preferably in a remote server for later use. Whenever a new vehicle design is introduced to the market, the vehicle's inverse impulse response is preferably calculated and stored in the call center data base with the vehicle profile for easy reference. Any time after the vehicle is activated for telematics services, then the vehicle inverse impulse response function can be downloaded to the vehicle system module from the call center, and can be applied to speech recognition processes just prior to a feature extraction stage thereof. Alternatively or additionally, the inverse impulse response can be loaded to the vehicle system module during the vehicle assembly processes.

At step 630, it is determined whether all inverse impulse response functions have been created and stored for each vehicle or vehicle cluster. If not, then the method loops back to steps 610 through 630. If so, the method terminates at step 635.

Figure 7:
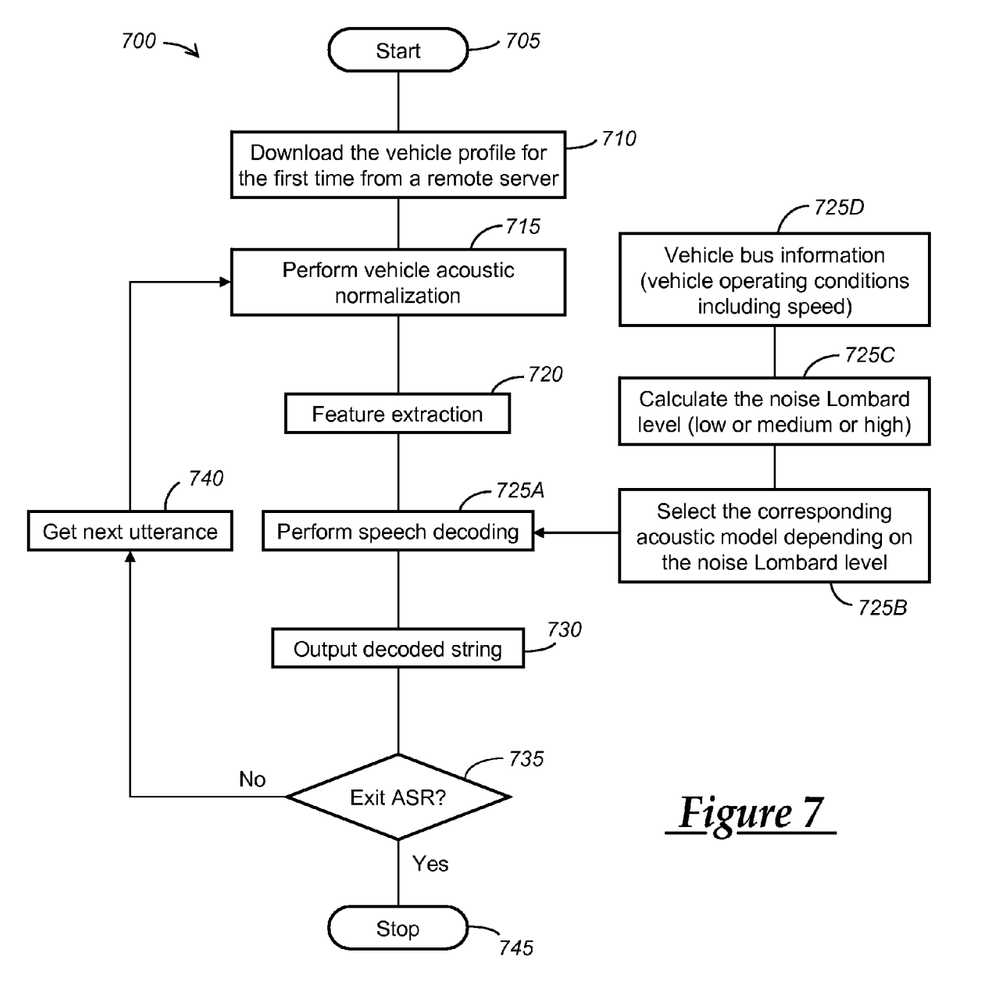
FIG. 7 is a flow chart of an embodiment of an exemplary method of recognizing normalized in-vehicle speech that can be performed in conjunction with the methods of FIGS. 3 through 6 and using the telematics system and ASR architecture of FIGS. 1 and 2.

FIG. 7 illustrates an exemplary method 700 of decoding normalized in-vehicle speech. The method is initialized at step 705.

At step 710, a vehicle profile is downloaded to the vehicle from the call center.

At step 715, normalization of in-vehicle speech is performed. As a preliminary matter, speech utterances are received by the IVM of the vehicle, and acoustic data is extracted from the received speech. Then, normalization is carried out by applying the inverse impulse response function determined from step 620 for the particular vehicle in which speech recognition is being carried out. The inverse impulse response function is applied to the acoustic data extracted from the received speech. More specifically, those skilled in the art will recognize that acoustic values of the inverse impulse response function are convolved by acoustic values of the data extracted from the IVM signal to yield normalized data, or data wherein the effects of vehicle acoustics of the particular vehicle are factored out. Because the inverse impulse response function is determined between the IVM and MRP, in-vehicle speech is effectively normalized all the way back to the MRP along the speech path, rather than just at the IVM.

According to an alternative implementation, step 715 can be omitted where speech recognition is being carried out in a testing environment without background vehicle noise.

At step 720, the normalized data from step 715 are pre-processed to extract normalized acoustic feature vectors therefrom.

At steps 725A-725D, speech decoding is performed on the normalized acoustic feature vectors using Lombard level specific global acoustic models, which are built according to a plurality of Lombard levels of a Lombard speech corpus covering a plurality of vehicles. At step 725D, vehicle information is accessed from a suitable vehicle bus or database and includes vehicle operating conditions like speed. At step 725C, the Lombard level of noise is calculated from the vehicle information. At step 725B, the calculated Lombard level from step 725C is used to select an acoustic model from a suitable database that corresponds to the same Lombard level. At step 725A, the selected acoustic model from step 725C is applied during decoding. The acoustic models are preferably those generated in accordance with the methods of FIGS. 4 and/or 5.

At step 730, a recognized string of subwords or words is output from the decoder.

Steps 720 through 730 can be carried out using any of several different techniques. In one exemplary implementation, any of steps 720 through 730 can be carried out on the vehicle using the embedded speech recognition system. In other exemplary implementation, any of steps 720 through 730 can be carried out in a remote server such as at the call center, using a more powerful decoder module and hardware.

In yet another exemplary implementation, steps 720 through 730 can be carried out using a distributed speech recognition architecture wherein feature extraction is performed on a client side such as the vehicle and decoding is carried out in a remote server such as the call center.

At step 735, it is determined whether a current ASR session is complete or whether another utterance or portion thereof needs to be retrieved. If not, then the method loops back to steps 715 through 735 until a current ASR session is complete. If so, then the method terminates at step 745.

Thus, according to the methods 300 through 700, variations in vehicle cabin acoustics are intelligently removed from or factored out of in-vehicle utterances, and the resultant refined in-vehicle speech data resembles data produced in a sound-controlled environment such as a quiet office setting. Accordingly, relatively simple acoustic models developed in a quiet office environment can be used to decode the speech, instead of relatively complex acoustic models developed specifically for every different vehicle type. Because the acoustic model complexity can be reduced, less memory, computing power, and time can be used in applying the acoustic models during speech decoding. Ultimately, applying normalization and decoding techniques according to the present methods is expected to improve speech recognition accuracy and speed.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of speech recognition comprising the steps of: (a) receiving speech in a vehicle; (b) extracting acoustic data from the received speech; and (c) applying a vehicle-specific inverse impulse response function to the extracted acoustic data to produce normalized acoustic data.

2. The method of claim 1, further comprising the steps of: (d) pre-processing the normalized acoustic data to extract normalized acoustic feature vectors; and (e) decoding the normalized acoustic feature vectors using as input at least one of a plurality of global acoustic models, wherein each model is distinguished from the other models based on a Lombard level.

3. The method of claim 2, further comprising the steps of: (f) calculating the Lombard level of vehicle noise; and (g) selecting the global acoustic model of the plurality of global acoustic models that corresponds to the calculated Lombard level for application during the decoding step (e).

4. The method of claim 2, wherein the global acoustic models are based on a Lombard speech corpus developed in a sound-controlled environment using a plurality of speakers, a plurality of different levels of noises, and a plurality of different utterances.

5. The method of claim 4, wherein the global acoustic models are built after extracting acoustic features of speech from the Lombard speech corpus without noise reduction.

6. The method of claim 4, wherein the global acoustic models are built by selecting a Lombard level, gathering speech data corresponding to the selected Lombard level from the Lombard speech corpus, selecting one or more vehicles that exhibit noise at the selected Lombard level, mixing the gathered speech data with acoustic data from the selected one or more vehicles, and extracting acoustic features of speech from the Lombard speech corpus with noise reduction.

7. The method of claim 2, wherein the decoding step is performed in-vehicle.

8. The method of claim 2, wherein the decoding step is performed in a remote server.

9. The method of claim 1, wherein the inverse impulse response function is determined by first determining an impulse response function for the vehicle and then mathematically calculating the inverse of the impulse response function.

10. The method of claim 1, wherein the inverse impulse response function is determined by determining correlation and/or covariance between an audio signal received from an integrated vehicle microphone (IVM) on a first channel and an audio signal received from a mouth reference position (MRP) microphone at a second channel, wherein the IVM is designated as an input and the MRP microphone is designated as an output.

11. A method of speech recognition for a plurality of vehicles, comprising the steps of: (a) developing a corpus of Lombard speech data; (b) building a plurality of global acoustic models based on the corpus of Lombard speech data; (c) receiving speech in a vehicle using an integrated vehicle microphone; (d) generating an inverse impulse response function for each of the plurality of vehicles; (e) extracting acoustic data from the received speech; and (f) applying the vehicle-specific inverse impulse response function to the extracted acoustic data to produce normalized acoustic data.

12. The method of claim 11, wherein the corpus of Lombard speech data includes a plurality of Lombard levels, and wherein each model of the plurality of global acoustic models is distinguished from the other models based on a Lombard level of the plurality of Lombard levels.

13. The method of claim 11, wherein the inverse impulse response function is determined by first determining an impulse response function for the vehicle and then mathematically calculating the inverse of the impulse response function.

14. The method of claim 11, wherein the inverse impulse response function is determined by determining correlation and/or covariance between an audio signal received from an integrated vehicle microphone (IVM) on a first channel and an audio signal received from a mouth reference position (MRP) microphone at a second channel, wherein the IVM is designated as an input and the MRP microphone is designated as an output.

15. The method of claim 11, wherein the Lombard speech corpus is developed in a sound-controlled environment using a plurality of speakers, a plurality of different levels of noises, and a plurality of different utterances.

16. The method of claim 15, wherein the global acoustic models are built after extracting acoustic features of speech from the Lombard speech corpus without noise reduction.

17. The method of claim 16, wherein the global acoustic models are built by selecting a Lombard level, gathering speech data corresponding to the selected Lombard level from the Lombard speech corpus, selecting one or more vehicles that exhibit noise at the selected Lombard level, mixing the gathered speech data with acoustic data from the selected one or more vehicles, and extracting acoustic features of speech from the Lombard speech corpus with noise reduction.

18. The method of claim 11, further comprising the steps of: (g) pre-processing the normalized acoustic data to extract acoustic feature vectors; (h) decoding the normalized acoustic feature vectors using as input at least one of a plurality of global acoustic models, wherein each model is distinguished from the other models based on a Lombard level of a Lombard speech corpus covering a plurality of vehicles; (i) calculating the Lombard level of vehicle noise; and (j) selecting the at least one of the plurality of global acoustic models that corresponds to the calculated Lombard level for application during the decoding step (h).

19. The method of claim 18 wherein the decoding step is performed in a remote server.

20. A method of speech recognition for a plurality of vehicles, comprising the steps of: (a) developing a corpus of Lombard speech including a plurality of Lombard levels; (b) building a plurality of global acoustic models based on the corpus of Lombard speech data, wherein each model of the plurality of global acoustic models is distinguished from the other models based on a Lombard level of the plurality of Lombard levels; (c) receiving speech in a vehicle using an integrated vehicle microphone; (d) generating an inverse impulse response function for each of the plurality of vehicles, wherein the inverse impulse response function is determined by at least one of first determining an impulse response function for the vehicle and then mathematically calculating the inverse of the impulse response function, or determining correlation and/or covariance between an audio signal received from an integrated vehicle microphone (IVM) on a first channel and an audio signal received from a mouth reference position (MRP) microphone at a second channel wherein the IVM is designated as an input and the MRP microphone is designated as an output; (e) extracting acoustic data from the received speech; (f) applying the vehicle-specific inverse impulse response function to the extracted acoustic data to produce normalized acoustic data; (g) pre-processing the normalized acoustic data to extract acoustic feature vectors; (h) decoding the normalized acoustic feature vectors using as input at least one of a plurality of global acoustic models, wherein each model is distinguished from the other models based on a Lombard level of a Lombard speech corpus covering a plurality of vehicles; (i) calculating the Lombard level of vehicle noise; and (j) selecting the at least one of the plurality of global acoustic models that corresponds to the calculated Lombard level for application during the decoding step (h).

* * * * *